U S 0 1 1 4 3 7 8 0 9 B 2

US011437809B2

(12) United States Patent
Burnett et al.

(10) Patent No.: US 11,437,809 B2
(45) Date of Patent: Sep. 6, 2022

(54) CAPACITOR UNIT WITH PRESSURE SENSOR AND PRESSURE RELIEF VALVE

(71) Applicant: GENERAL ELECTRIC TECHNOLOGY GMBH, Baden (CH)

(72) Inventors: Alistair Burnett, Stafford (GB); Neil Spibey, Stafford (GB)

(73) Assignee: General Electric Technology GmbH, Baden (CH)

( * ) Notice: Subject to any disclaimer, the term of this patent is extended or adjusted under 35 U.S.C. 154(b) by 706 days.

(21) Appl. No.: 16/348,460

(22) PCT Filed: Oct. 24, 2017

(86) PCT No.: PCT/EP2017/077053
§ 371 (c)(1),
(2) Date: May 8, 2019

(87) PCT Pub. No.: WO2018/086854
PCT Pub. Date: May 17, 2018

(65) Prior Publication Data
US 2019/0273374 A1 Sep. 5, 2019

(51) Int. Cl.
*H02H 7/16* (2006.01)
*H01G 4/015* (2006.01)
(Continued)

(52) U.S. Cl.
CPC ............... *H02H 7/16* (2013.01); *H01G 2/08* (2013.01); *H01G 2/14* (2013.01); *H01G 4/015* (2013.01);
(Continued)

(58) Field of Classification Search
CPC .. H02H 7/16; H01G 2/08; H01G 2/14; H01G 4/015; H01G 4/18; H01G 4/224;
(Continued)

(56) References Cited

U.S. PATENT DOCUMENTS

| 4,419,660 A | 12/1983 | Bergdahl |
| 4,639,827 A | 1/1987 | Strange et al. |
| 6,359,423 B1 | 3/2002 | Noro |
| 2013/0069603 A1 | 3/2013 | Wendell et al. |

FOREIGN PATENT DOCUMENTS

| CN | 102801295 A | * 11/2012 |
| DE | 3138271 | 4/1983 |

(Continued)

OTHER PUBLICATIONS

Translation of DE3138271A description, translated by Patent Translate, 10 pages, translated Feb. 2022. (Year: 2022).*

(Continued)

*Primary Examiner* — Harry R Behm
(74) *Attorney, Agent, or Firm* — Eversheds Sutherland (US) LLP

(57) ABSTRACT

This application describes methods and apparatus for the safety and protection of capacitor units suitable for medium and high voltage applications, for instance within switching modules (400) of a voltage source converter as may be used for HVDC or FACTs. The capacitor unit (300) has a housing (201) within which is a capacitor comprising a plastic film dielectric material, for instance a winding (100) of first and second plastic films (101, 102) with metal coatings (103, 104). A pressure sensor (302) is configured to detect if the pressure in the housing exceeds a first pressure level and a pressure relief valve (304) is configured to vent gas from the housing if the pressure in the housing exceeds a second pressure level which is higher than the first pressure level.

13 Claims, 2 Drawing Sheets

(51) Int. Cl.
*H01G 4/18* (2006.01)
*H01G 4/224* (2006.01)
*H01G 4/32* (2006.01)
*H01G 4/38* (2006.01)
*H01G 4/40* (2006.01)
*H02M 7/00* (2006.01)
*H01G 2/08* (2006.01)
*H01G 2/14* (2006.01)

(52) U.S. Cl.
CPC ............... *H01G 4/18* (2013.01); *H01G 4/224* (2013.01); *H01G 4/32* (2013.01); *H01G 4/38* (2013.01); *H01G 4/40* (2013.01); *H02M 7/003* (2013.01)

(58) Field of Classification Search
CPC .. H01G 4/32; H01G 4/38; H01G 4/40; H02M 7/003
See application file for complete search history.

(56) References Cited

FOREIGN PATENT DOCUMENTS

| DE | 102005018339 | | | 10/2006 | |
|----|----|----|----|----|----|
| DE | 102005018339 | A1 | * | 10/2006 | ............... H01G 2/14 |
| EP | 1130734 | | | 9/2001 | |
| EP | 1873796 | | | 1/2008 | |
| EP | 1873796 | A1 | * | 1/2008 | ............... H01G 2/18 |
| GB | 2 437 116 | | | 10/2007 | |
| JP | 2000195748 | A | * | 7/2000 | |
| WO | WO-2017028992 | A1 | * | 2/2017 | |

OTHER PUBLICATIONS

European Supplemental Search Report for EP 16 19 8036 dated May 31, 2017.
PCT International Search Report and Written Opinion for PCT Application No. PCT/EP2018/052401 dated Apr. 5, 2018.

* cited by examiner

CAPACITOR UNIT WITH PRESSURE SENSOR AND PRESSURE RELIEF VALVE

CROSS-REFERENCE TO RELATED APPLICATIONS

This application is a U.S. National Stage Application under 35 U.S.C. 371 and claims the priority benefit of International Application No. PCT/EP2017/077053 filed Oct. 24, 2017 which claims priority to EP16198036.2, filed Nov. 9, 2016, which are incorporated herein by reference.

This application relates to capacitors and especially to capacitor units that are suitable for medium or high-voltage operation, and in particular to capacitor units with protection/safety features.

There are a number of applications where capacitors may be used as energy storage elements and some applications call for relatively large and/or high voltage DC capacitive energy storage devices. For instance; for electric power transmission there is often a need for relatively large value capacitors able to operate at relatively high voltages. Flexible Alternating Current Transmission Systems (FACTS) and High Voltage Direct Current (HVDC) power transmission are two examples that employ power converters such as voltage source converters (VSCs) that typically require relatively large capacitances.

VSCs are highly controllable converters which can accurately produce desirable voltage forms with low harmonic components. Many VSC designs, such as the Modular Multilevel Converter (MMC) or Alternate Arm Converter (AAC) for example, make use of a number of modules where each module has a capacitor that, in use, can be connected in series between the terminals of the module or bypassed. The capacitors of the VSC modules may be provided by one or more high voltage capacitor units.

Capacitors used for high and medium voltage applications may typically be formed from two sheets of metallized plastic film which are wound together so that the metal layers are separated by the plastic film dielectric. The plastic film is commonly polypropylene. This design makes the capacitor physically compact, low cost and allows the use of features such as self-healing to protect the winding. One or more windings may be located in a housing to form a capacitor unit.

One issue with such a design of capacitor is that a metallized plastic film such as polypropylene is flammable and gives off explosive hydrocarbon gasses when heated to melting point. There is typically a significant amount of the plastic film in each capacitor unit, for example of the order of 50 kg or more. This poses a number of safety and protection issues and fire and explosion protection of the capacitor unit is therefore an important part of the power converter design.

Embodiments of the present disclosure relate to methods and apparatus for safety, protection and/or failure detection of capacitors and/or power converter apparatus using capacitors.

Thus according to the present invention there is provided a capacitor unit comprising: a housing; a capacitor within the housing comprising a plastic film dielectric material; a pressure sensor configured to detect if pressure in the housing exceeds a first pressure level; and a pressure relief valve configured to vent gas from the housing if the pressure in the housing exceeds a second pressure level which is higher than the first pressure level.

Embodiments thus provide a pressure sensor to detect if the pressure inside the housing increases to a first pressure level. This can be used to indicate a fault to an external fault controller, such as a controller of a power converter. The external fault controller may act to isolate the capacitor unit from an electrical source if such a fault is detected. However to provide a safety critical protection system there is also an automatic venting system for reducing the pressure if the pressure detection fails to operate correctly.

The pressure sensor may be a pressure switch configured to activate if the pressure in the housing exceeds the first pressure level. A capacitor unit controller may be configured to generate an alert if the pressure sensor detects that the pressure in the housing exceeds a first pressure level.

In some embodiments the capacitor unit controller is also configured to monitor voltages at terminals of the capacitor unit and to generate an alert if the rate of change of voltage exceeds a threshold.

The capacitor unit may thus be configured to be operated, in use, with a fault controller wherein, in the event that the pressure sensor detects that the pressure in the housing exceeds a first pressure level the fault controller operates within a fault response time to isolate the capacitor unit from an electrical input. The second pressure level may be greater than the first pressure level by an amount which is at least equal to a predetermined maximum expected pressure rise during the fault response time, for instance based on the known fault response time and a known maximum expected rate of pressure increase.

The pressure sensor may be located to be near to and/or oriented in the same direction as terminals of the capacitor unit. The pressure relief valve may be configured to vent gas in a direction which is away from any electrical connections to the capacitor unit. The pressure relief valve may be a non-return valve.

The capacitor may comprise a winding of first and second metallized plastic films and the winding may comprise at least one of: self-healing protection where the metal layers are configured burn away faster than the plastic film; segmentation protection where the metal layers are segmented into distinct areas connected to the capacitor terminals via fuse lines; and serial-connection protection wherein the winding comprises multiple capacitances in series.

The housing may be deformable, e.g. expandable, in response to a pressure increase within the housing.

An apparatus may comprise a first capacitor unit as described above located to be adjacent to a second capacitor unit. The second pressure level may be such that the maximum deformation of the first capacitor unit housing in a direction towards the second capacitor unit is less than the separation between the first and second capacitor units.

Embodiments also relate to a module for a voltage source converter comprising a capacitor unit as described in any of the variants mentioned above. The module may have first and second terminals and at least first and second switches for selectively connecting the capacitor unit between the first and second terminals or connecting the first and second terminals in a path that bypasses the capacitor unit. The module may also have a bypass switch between the first and second terminals and a converter controller configured to close the bypass switch in the event that the pressure sensor detects that the pressure in the housing exceeds a first pressure level.

Where the capacitor unit controller also monitors the voltages at the capacitor terminals the converter controller may also be configured to close the bypass switch in the event that the capacitor unit controller generates an alert that the rate of change of voltage exceeds a threshold.

Embodiments also relate to a voltage source converter comprising a plurality of modules as described.

Various illustrative embodiments of the present invention will now be described, by way of example only, with reference to the accompanying drawings, of which:

Figure 1:
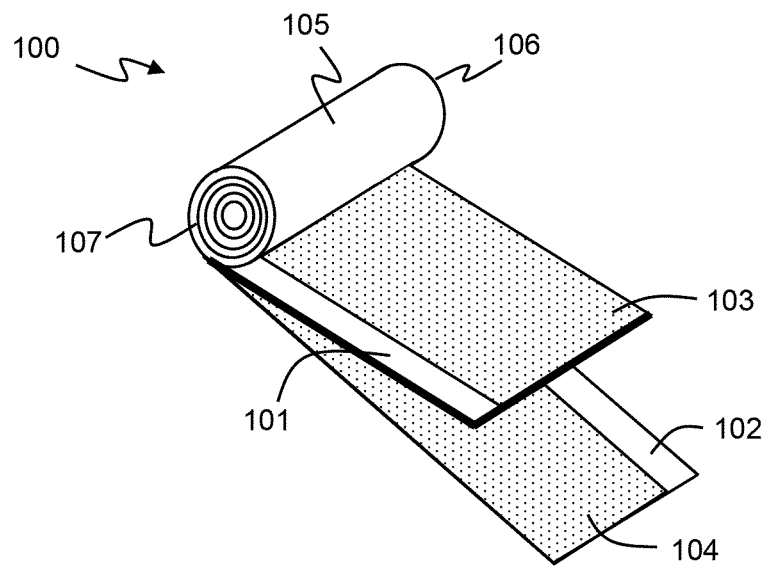
FIG. 1 illustrates a capacitor winding.

As described above capacitor units that are used for medium and high voltage applications may comprise a winding of metallized plastic dielectric films. FIG. 1 illustrates the principle of a capacitor winding 100. A first plastic film 101 is wound together with a second plastic film 102, where the first and second plastic films have metal coatings 103 and 104 respectively. FIG. 1 illustrates the individual films 101 and 102 extending from wound section 105 for clarity, but in use the films will be tightly wound together as would be understood by one skilled in the art. The metal coatings 103 and 104 may each extend to one edge of the respective film 101 or 102 but have a gap at the other edge, with the coatings on the different films extending to opposite edges. This allows the end faces 106 and 107 to be used for electrical connection to the respective metal layer 103 and 104, i.e. the electrodes of the capacitor formed by the winding 100, although other arrangements and different connections may be implemented. It will also be appreciated that whilst FIG. 1 illustrates a winding having a generally circular profile in cross-section other arrangements may have different profile shapes, such as more like a rounded rectangle. The plastic dielectric films may typically be formed from polypropylene.

Such an arrangement can provide relatively compact and low-weight capacitors with a large electrode area and hence relatively large capacitance value.

Figure 2:
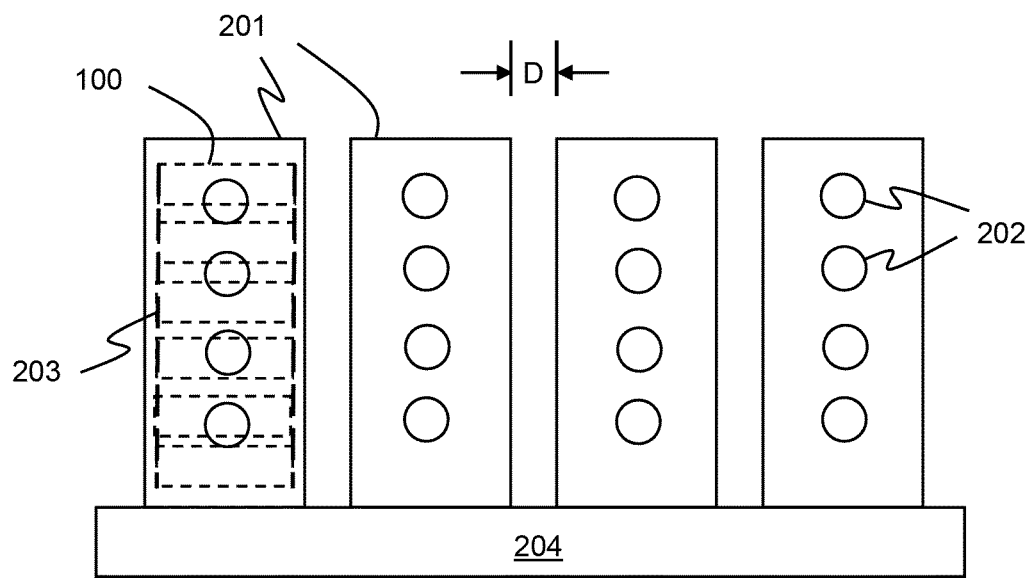
FIG. 2 illustrates a stack of capacitor units.

As illustrated generically in FIG. 2 one or more capacitor windings 100 may be arranged within a housing 201 and electrically connected to terminals 202 extending from the housing to form a capacitor unit. Adjacent windings may be connected to one another by electrical connections 203, e.g. by conductive braids connected to the end faces of the windings as described above. Groups of connected windings may be electrically connected to busbars (not shown in FIG. 2 for clarity) that connect the windings to the output terminals 202 of the capacitor housings. FIG. 2 illustrates just a few windings for clarity but one skilled in the art will appreciate that there could be tens of windings, e.g. up to 100 or more windings, in a given housing forming a capacitor unit. One skilled in the art will also appreciate that the arrangement illustrated in FIG. 2 is just one example of how multiple windings may be arranged in the capacitor unit housing and the windings may be arranged in the housing and connected to one another and the output terminals in a variety of ways and the present disclosure is not limited to any one particular arrangement.

For applications such as power converters, a plurality of capacitor units may be mounted on a support 204 adjacent to one another in a stack. In use the capacitors of the capacitor units may be connected in series as required to provide the desired power conversion.

Creating a competitively sized capacitor design typically means having the highest possible dielectric stress across the dielectric film 101, 102 in the winding 100 of the capacitor, i.e. the maximum voltage per unit thickness. Operating with such a high dielectric stress does however mean that localised sites within the dielectric plastic film 101, 102 may be expected to fail and experience dielectric breakdown (or short circuit of the capacitor) on a routine basis throughout the life of the capacitor, which may thus occur during operation of a power converter using such a capacitor.

To mitigate against this problem various protection strategies may be used for the capacitor winding 100, which will be referred to herein as winding protection.

For instance self-healing metallisation is a well-known mechanism for neutralising the damaging effects of electrical dielectric stress within the plastic film. Self-healing is normally achieved by arranging the metallisation coatings 103, 104 on the plastic films 102, 102 to burn back at a faster rate than the plastic film substrate melts. If a localised site of the plastic film experiences dielectric breakdown this will result in energy discharge at that site due to the localised short-circuit. This can damage the dielectric which could result in dielectric breakdown of adjacent areas. Unchecked this could cause a catastrophic short circuit failure of the capacitor winding. By ensuring that the metal coating burns back at a faster rate than dielectric plastic film however, then in the event of energy discharge at a localised site, the metal layer forming the capacitor electrode vaporises from around the area of discharge before areas of the plastic film adjacent to the initial failure site are damaged. The electrodes forming the capacitor in the vicinity of the breakdown site are thus effectively removed to isolate the breakdown spot, which ends the discharge and the capacitor winding can continue to function, albeit with a slightly reduced capacitance due to the reduced electrode area.

A second winding protection mechanism routinely employed in metalized DC capacitors is the use of segmentation which divides the capacitor winding metallization into segments that are connected to the capacitor terminals through special narrow regions of metallisation usually known as fuse gates. If a dielectric breakdown occurs within a segment then the high current density flowing in the fuse gate from the fault burns the metallisation away and disconnects the faulty segment thus allowing the capacitor to continue normal operation. Similarly to the self-healing protection, this is a sacrificial failure mode that allows continued operation of the capacitor whilst experiencing a certain degree of routine levels of dielectric failure.

Another winding protection strategy normally used for metalized DC capacitors is series connection which weaves the dielectric stress several times across the same plastic film barrier in a winding to form a structure of several series connected capacitors. For example the first film 101 could have a metallization layer with first and second distinct regions, say separated by a central gap, which is wound with the second film 102 having a continuous metallization layer. The continuous metallization layer of the second film links the split halves of the metallization of the first film and is therefore at half of the capacitor voltage. The advantage of series connection from the protection point of view is that two dielectric failures would have to occur in order to get a short circuit through the complete capacitor so this arrangement therefore provides a degree of redundancy.

Whilst such winding protection strategies are useful at preventing catastrophic failure of the capacitor winding there will occasionally be instances where the relevant protection strategy fails to operate correctly, which can result in uncontrolled dielectric breakdown of the dielectric film. Such a failure can result in melting and pyrolisation of the plastic film 101 and 102 of the capacitor winding thereby releasing comparatively large volumes of gas. For a polypropylene dielectric film, uncontrolled breakdown will release large quantities of hydrogen-rich and therefore flammable gas.

The housing 201 of a capacitor unit may thus typically comprise a gas tight sealed housing for containing the capacitor winding. The sealed housing 201 excludes atmospheric oxygen from reaching the polypropylene thus preventing the possibility of fire. The housing 201 may be fabricated from relatively thin sheet metal material so that it can delaminate from internal components and inflate to absorb the additional gas volume from any gas pressure increase. However for relatively large capacitors there may be considerable gas pressure build up from a failure of the winding and it may not be practical to simply contain the generated gas.

In addition, as mentioned above and illustrated in FIG. 2, in use in power converter applications such as voltage-source-converters (VSCs), a plurality of capacitor units may be arranged next to one another. As noted previously some VSCs use many series connected modules to form a converter arm. In such VSC designs the capacitor units of the modules of a converter arm may typically stacked side by side.

To reduce the footprint of the converter and ensure that the converter power density is as high as possible, the capacitor units may be stacked with only a small gap, D, between them, that may be of the order of a few millimetres or so.

As noted the capacitor housing 201 is typically metal and is typically connected so as to be, in use, at the same voltage as an internal voltage level, for instance the housing may be connected to a negative capacitor terminal. The physical gap D between capacitor units should therefore be maintained at all times because each series connected element, and each capacitor unit, shares a proportion of the voltage across the converter arm.

It has therefore been appreciated by the present inventors that excessive inflation of the capacitor housing may reduce and potentially bridge the gap between adjacent capacitor units. Flashover between the two capacitor housings either side of the inflated capacitor housing may occur, effectively short-circuiting part of the converter arm and causing undesirable failure of the affected elements.

Over inflation of the capacitor unit also causes a considerable storage of mechanical energy in the pressure of the stored gas, which could reach around 20 Bar or so before the housing is ruptured. The gases are explosive and thus there is the risk of a significant and sudden release of mechanical and chemical energy through explosion if the housing ruptures, which would likely badly damage the power converter.

Another problem with an inflated capacitor is that it may be mechanically jammed within the converter assembly, e.g. within the stack of capacitor units, and it may not be possible for the capacitor unit to be removed for servicing or replacement without first safely releasing the stored gas pressure.

As discussed above excessive inflation is only likely to occur when the capacitor winding undergoes uncontrolled breakdown, which may only happen if the winding protection fail to operate correctly. The winding protection failure rate is typically extremely low at around 1 in 100,000. For some applications such a low failure rate for the protection would be adequate. However for applications such as power converters for power transmission such as HVDC or FACTs there may be a large number of capacitor units required which will be installed in a valve hall that cannot be accessed during operation of the converter for safety reasons. For instance, for an HVDC scheme of Gigawatt level using say 8000 capacitors with a service life of 40 years, it may therefore be expected that there will be a few examples in the population where capacitor windings will fail without the winding protection operating correctly, resulting in large and dangerous levels of gas pressure build up in the relevant capacitor units.

In addition the effectiveness of the protection offered by winding protection strategies such as segmentation depends partly on the degree of segmentation applied. Aggressive use of winding protection strategies can however impact on the electrical performance of the capacitor and have cost and size implications.

Embodiments of the present disclosure thus relate to a capacitor unit with over-inflation warning and protection. The over-inflation warning and protection can provide a back-up safety system for identifying when winding protection has failed to protect the capacitor winding.

In embodiments of the disclosure pressure sensing may be used to detect an increase in pressure within the housing of a capacitor unit. Detection of a pressure increase can be used to signal a fault with the capacitor unit. In power converter applications where the capacitor unit is part of a module of a power converter, a fault with the capacitor unit could be signalled to a converter controller to stop use of the relevant capacitor unit, and thus the relevant power module. In addition automatic venting is used to release pressure from the capacitor unit if necessary.

Figure 3:
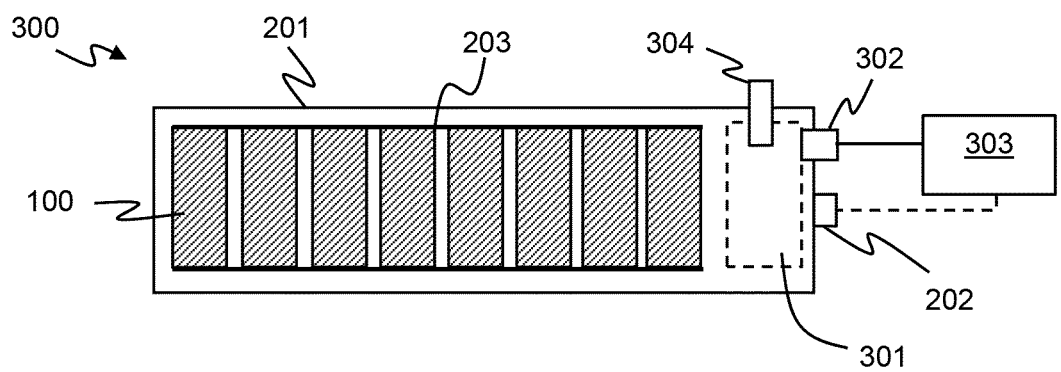
FIG. 3 illustrates a capacitor unit according to an embodiment.

FIG. 3 illustrates a capacitor unit 300 according to an embodiment. The capacitor unit 300 has a group of capacitor windings 100 within a normally sealed gas tight housing 201. The housing is arranged such that in the event of gas being generated in use through failure of the capacitor winding 100, e.g. through pyrolysis of a polypropylene dielectric film of the capacitor winding, such gas can travel to a space 301 within the housing which is referred to as an air pocket. In the event of gas build up within the housing 201 the pressure within the housing 201 and within the air pocket region 301 will increase. A pressure sensor 302 is provided to determine whether the pressure within the housing, e.g. in the air pocket region 301, exceeds a first pressure level. The pressure sensor may, in some embodiments, be a pressure switch such as a micro-switch which is activated if the pressure exceeds the first pressure level. A capacitor unit controller 303 may be connected to the pressure switch 302 so as to detect activation of switch 303 and generate an alert.

An increase in gas pressure within the housing 201 can be taken to be an indication of failure of the capacitor winding 100. Detecting the increase in pressure in the capacitor unit housing 201 via the pressure switch 302 thus provides an indication of failure of the capacitor unit. The first pressure level, above which the pressure switch 302 activates, will be a pressure level that is high enough to indicate a fault but may be well below any dangerous pressure level is reached.

Figure 4:
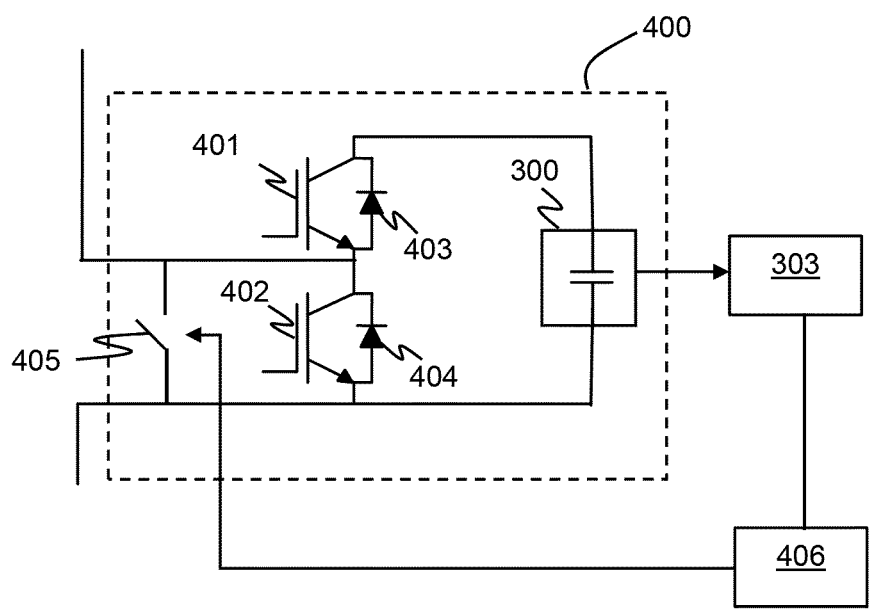
FIG. 4 illustrates a power converter module according to an embodiment.

In some embodiments the capacitor unit may be used as part of a switching module of a power converter such as a VSC. FIG. 4 illustrates one example of a switching module 400 of a VSC. For at least some types of VSC a plurality of such switching modules may be connected in series to form a converter arm between an AC terminal and a DC terminal of the VSC. The switching module 400 comprises at least one capacitor unit 300 and at least first and second switches 401 and 402, each switch in parallel with a respective anti-parallel diode 403 and 404. The switches 401 and 402 may typically be semiconductor switching elements such as IGBTs. The switches are arranged such that the capacitor unit may be connected between the terminals of the module or bypassed as required. FIG. 4 illustrates a half-bridge switch arrangement but it will be appreciated by one skilled in the art that other arrangements, such as a full bridge switch arrangement may be used for at least some switching modules.

The switching module 400 also comprises a bypass switch 405 which is open during normal operation of the switching module. In the event of a fault with the switching module a converter controller 406 may activate the bypass switch to close, thus effectively short-circuiting the terminals of the switching module and isolating the components of the switching module 400 from the converter arm.

The converter controller 406 which may be a local controller for the switching module or a higher level controller, may be coupled to receive an alert from the capacitor unit controller 303 in the event that activation of the pressure switch 302 is detected. On receiving such an alert, which can be taken as indication of failure of the capacitor unit 300, the converter controller 406 may activate closing of the bypass switch thus isolating the capacitor unit 300 from the voltage across the converter arm. As such this may prevent further damage to the capacitor winding of the capacitor unit 300 and avoid further pressure build up within the capacitor unit housing 201 with the associated risk. This also removes a faulty switching module 400 from operation in the power converter which avoids disruption of the operation of the complete converter.

Converter operation can still continue with a bypassed switching module since a number of spare redundant modules are included. The protective action may be reported back to a higher level controller so that the converter operator is aware of the cause of the fault and the protective action taken inside the hall.

The capacitor unit controller 303 and converter controller 406 have been illustrated and explained as separate elements for clarity but in some embodiments the functions of these controllers could be combined and implemented by a single functional module.

The pressure sensor 302 thus provides a means to notify of a problem with the capacitor unit 300 which can be used to operate a bypass switch or prompt some other control action to stop use of the capacitor unit. However it has been appreciated by the present inventors that a pressure sensor such as pressure switch may typically have a Failure-in-Time (FiT) of around 100. As mentioned previously the over-inflation warning and protection implemented by the pressure switch 302 is a back-up protection for identifying when the winding protection has failed. The winding protection however may have a FiT rate of less than 10. In other words the pressure sensor may be less reliable than the protection it is providing back-up for.

The pressure sensor is therefore useful for detecting and signalling the existence of a fault but in embodiments of the present invention is supplemented by a pressure relief system.

Referring back to FIG. 3 the capacitor unit 300 thus also comprises a pressure relief valve 304. The pressure relief valve 304 is an automatic valve that operates at a second pressure level to vent gas from the housing. The pressure relief valve may be located so as to vent gas from the air pocket space 301.

It may be preferred not to vent gas from the housing 201 of the capacitor unit 300 if not necessary. However it may be preferable to vent gas than let over-inflation of the housing 201 occur.

The second pressure level, at which the pressure relief valve operates, may therefore be higher than the first pressure level at which the pressure sensor generates an alert, e.g. the pressure switch activates. The second pressure level may be chosen based on the expected rate of increase of pressure in the housing 201 during failure of the capacitor winding and a fault response time for the particular application. The fault response time corresponds to the time taken for external control to respond to an alert generated by the pressure sensor to isolate the capacitor unit. For instance if used in the switching module 400 of FIG. 4 the fault response time may be the time between the pressure switch 302 activating and the bypass switch 405 of the switching module 400 being closed.

The second pressure level may thus be coordinated with the first pressure level such that it is expected that, in the event of a failure of a capacitor winding leading to an increase in pressure, there would be time for the pressure switch to activate to generate an alert and the necessary protective measures taken to isolate the capacitor unit, before the second pressure level is reached.

However; where the pressure sensor fails to detect the pressure increase then the pressure relief valve would operate at the higher level to prevent the pressure within the housing 201 building to a dangerous level. The pressure relief valve 304 can thus be seen as the primary and safety critical protection means with the pressure sensor 302 being the second protection means. The possibility of an explosion that arises with over-inflation requires a safety critical protection means and providing this with electronics and firmware in an external processing loop is difficult to guarantee.

For applications for power converters a first capacitor unit may be stacked to be adjacent to a second capacitor unit as described above. The second pressure level at which the pressure release valve 304 operates may correspond to a pressure level before the resultant expansion of the housing 201 reaches the point of causing a dielectric break down to the adjacent capacitors units. Thus the second pressure level may be such that the maximum deformation of the first capacitor unit housing in a direction towards the second capacitor unit is less than the separation between the first and second capacitor units. The separation between the first and second capacitor units may be such that without pressure venting the first capacitor unit housing could deform to contact the second capacitor unit housing (before rupture).

In some embodiments the pressure relief valve may operate to keep the pressure within the housing 201 below 0.5 Bar thus avoiding the need for the capacitor unit housing to comply with Pressure Vessels Directive legislation.

The gradual venting provided by the pressure relief valve 304 once it is acting can occur until the next scheduled outage of the power converter, if the pressure switch 302 detection has failed. The gas pressure may be vented continuously and gradually into the hall, where it is diluted safely with the atmosphere in the hall, before being removed by the air conditioning systems so the housing pressure and flammable gas concentration in the hall do not have chance to rise to dangerous levels.

The pressure release valve 304 is non-return so the internal volume of the capacitor housing 201 remains purged of atmospheric oxygen thus preventing the possibility of an explosion risk from sources of ignition inside the capacitor.

A capacitor housing 201 where the pressure release valve 304 has operated will be partially yet visibly inflated by the gas pressure rise acting upon the release valve. Thus a faulty capacitor unit that is venting gas but has failed to be bypassed because of a failed pressure switch 302 may be discovered during a routine inspection during a maintenance outage.

Referring back to FIG. 3 the pressure switch 302 may be arranged on or near a front face of the capacitor unit 300, i.e. which may be a face of the capacitor unit that bears the capacitor terminals 202. In some embodiments the pressure switch 302 may thus be located near and/or in the same orientation as the terminals of the capacitor unit so that wiring can be easily routed from the switch into local electronics located in its own housing on the terminal side of the capacitor.

The pressure relief valve 304 may be arranged to face away from the electronics housing, upwards in this example, so that any hydrogen rich gas vented by the valve is safely and quickly diluted into the open space of the Valve Hall to minimise the risk of an explosion. The pressure relief valve thus vents away from the direction of any electrical connections to the capacitor unit and therefore any sources of local ignition.

As described above the capacitor unit 300 may be arranged as a part of a module of a VSC, for instance a VSC configured for HVDC.

One feature of an HVDC converter is that it should keep operating to ride through low level faults. Sustained arcing from low level insulation break down is therefore a risk because the terminal voltage of the whole converter, of the order of hundreds of kilovolts say, is potentially available to create the arc and the transmission current will continue to flow to sustain it. Local faults tend to create very high but short lived peak fault currents, possibly of the order of hundreds of kA, that can be physically explosive as the local capacitor discharges into the fault (or even itself) but this is then backed up by the continuously flowing transmission current that is well regulated by the host control system at typically 1 kA rms to form a stable and sustained arc.

In some embodiments therefore the capacitor unit controller 303 may be configured to monitor the voltage at the capacitor terminals and determine if the rate of change of voltage, especially a rate of decrease of voltage, exceeds a threshold amount to detect a fault. The local controller 303 thus determines whether the capacitor voltage suddenly collapses at an unacceptably high rate of change. One of the causes of this happening could be a short circuit fault inside the capacitor, which could be due to a winding failure but is more likely to be an insulation breakdown between the interconnection conductors that link the windings to the capacitor terminals.

This rate of change of voltage protection generates an alert to close the protective bypass switch 405 if the capacitor voltage suddenly collapses at an unacceptably high rate of change. Such protection greatly assists detection of catastrophic faults within the capacitor that have sustained arcing and a very rapid onset/explosive event inside the capacitor that would otherwise be too quick for the slower pressure control methods to respond to. This rate of voltage change protection represents another aspect of the disclosure and could be implemented in addition to or instead of the pressure monitoring and pressure relief systems described above.

Embodiments thus relate to capacitor units that can be used with high voltages with over-inflation warning and protection. Embodiments also relate to switching modules of a power converter such as a VSC comprising such a capacitor module and to a VSC including such a capacitor unit. Embodiments are particularly suited to medium and high voltage applications such as HVDC, for instance for use in power converters with operating voltages of a few tens to a few hundreds of kilovolts.

It should be noted that the above-mentioned embodiments illustrate rather than limit the invention, and that those skilled in the art will be able to design many alternative embodiments without departing from the scope of the appended claims. The word "comprising" does not exclude the presence of elements or steps other than those listed in a claim, "a" or "an" does not exclude a plurality, and a single feature or other unit may fulfil the functions of several units recited in the claims. Any reference signs in the claims shall not be construed so as to limit their scope.

The invention claimed is:

1. A capacitor unit comprising:
a housing;
a capacitor within the housing comprising a plastic film dielectric material;
a pressure sensor configured to detect if pressure in the housing exceeds a first pressure level; and
a pressure relief valve configured to vent gas from the housing if the pressure in the housing exceeds a second pressure level which is higher than the first pressure level,
wherein the capacitor unit is configured to be operated, in use, with a fault controller wherein, in the event that the pressure sensor detects that the pressure in the housing exceeds the first pressure level the fault controller operates within a fault response time to isolate the capacitor unit from an electrical input wherein: the second pressure level is greater than the first pressure level by an amount which is at least equal to a predetermined maximum expected pressure rise during the fault response time.

2. The capacitor unit in claim 1, wherein the pressure sensor is a pressure switch configured to activate if the pressure in the housing exceeds the first pressure level.

3. The capacitor unit in claim 1, comprising a capacitor unit controller configured to generate an alert if the pressure sensor detects that the pressure in the housing exceeds the first pressure level.

4. The capacitor unit in claim 3, wherein the capacitor unit controller is also configured to monitor voltages at terminals of the capacitor unit and to generate an alert if a rate of change of voltage exceeds a threshold.

5. The capacitor unit in claim 1, wherein the pressure sensor is located to be near to and/or oriented in the same direction as terminals of the capacitor unit.

6. The capacitor unit in claim 1, wherein the pressure relief valve is configured to vent gas in a direction which is away from any electrical connections to the capacitor unit.

7. The capacitor unit in claim 1, wherein the pressure relief valve is a non-return valve.

8. The capacitor unit in claim 1, wherein the capacitor comprises a winding of first and second metallized plastic films and wherein the winding comprises at least one of: self-healing protection where the metal layers are configured burn away faster than the plastic film; segmentation protection where the metal layers are segmented into distinct areas connected to the capacitor terminals via fuse lines; and serial-connection protection wherein the winding comprises multiple capacitances in series.

9. The capacitor unit in claim 1, wherein the housing is deformable in response to a pressure increase within the housing.

10. An apparatus comprising:
a first capacitor unit comprising:
- a housing deformable in response to a pressure increase within the housing;
- a capacitor within the housing comprising a plastic film dielectric material;
- a pressure sensor configured to detect if pressure in the housing exceeds a first pressure level; and
- a pressure relief valve configured to vent gas from the housing if the pressure in the housing exceeds a second pressure level which is higher than the first pressure level, wherein the first capacitor unit is located to be adjacent to a second capacitor unit wherein the second pressure level is such that a maximum deformation of the first capacitor unit housing in a direction towards the second capacitor unit is less than a separation (D) between the first and second capacitor units, and wherein the first capacitor unit is configured to be operated, in use, with a fault controller wherein, in the event that the pressure sensor detects that the pressure in the housing exceeds the first pressure level the fault controller operates within a fault response time to isolate the first capacitor unit from an electrical input wherein: the second pressure level is greater than the first pressure level by an amount which is at least equal to a predetermined maximum expected pressure rise during the fault response time.

11. A module for a voltage source converter comprising a capacitor unit comprising:
- a housing deformable in response to a pressure increase within the housing;
- a capacitor within the housing comprising a plastic film dielectric material;
- a pressure sensor configured to detect if pressure in the housing exceeds a first pressure level; and
- a pressure relief valve configured to vent gas from the housing if the pressure in the housing exceeds a second pressure level which is higher than the first pressure level, wherein the capacitor unit is configured to be operated, in use, with a fault controller wherein, in the event that the pressure sensor detects that the pressure in the housing exceeds the first pressure level the fault controller operates within a fault response time to isolate the capacitor unit from an electrical input wherein: the second pressure level is greater than the first pressure level by an amount which is at least equal to a predetermined maximum expected pressure rise during the fault response time.

12. The module for a voltage source converter in claim 11, comprising:
- first and second terminals;
- at least first and second switches for selectively connecting the capacitor unit between the first and second terminals or connecting the first and second terminals in a path that bypasses the capacitor unit;
- a bypass switch between the first and second terminals; and
- a converter controller configured to close the bypass switch in the event that the pressure sensor detects that the pressure in the housing exceeds a first pressure level.

13. The module for a voltage source converter in claim 12, wherein the converter controller is configured to close the bypass switch in the event that the capacitor unit controller generates an alert that the rate of change of voltage exceeds a threshold.

* * * * *